United States Patent
Keifer, III

(10) Patent No.: US 11,647,250 B2
(45) Date of Patent: May 9, 2023

(54) METHODS AND SYSTEMS FOR REMOTE STREAMING OF A USER-CUSTOMIZED USER INTERFACE

(71) Applicant: Verizon Patent and Licensing Inc., Basking Ridge, NJ (US)

(72) Inventor: Carl L. Keifer, III, Pittsburgh, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/545,366

(22) Filed: Dec. 8, 2021

(65) Prior Publication Data
US 2022/0103887 A1 Mar. 31, 2022

Related U.S. Application Data

(63) Continuation of application No. 16/926,445, filed on Jul. 10, 2020, now Pat. No. 11,223,873.

(51) Int. Cl.
*H04N 21/431* (2011.01)
*H04N 21/633* (2011.01)
*H04N 21/6332* (2011.01)

(52) U.S. Cl.
CPC ....... *H04N 21/431* (2013.01); *H04N 21/6332* (2013.01)

(58) Field of Classification Search
CPC .................. H04N 21/431; H04N 21/6332

USPC ............................................. 725/37
See application file for complete search history.

(56) References Cited

U.S. PATENT DOCUMENTS

| | | | |
|---|---|---|---|
| 9,984,338 B2 | 5/2018 | Kumar et al. | |
| 11,416,298 B1* | 8/2022 | Barker, Jr. | ............ G06F 3/0664 |
| 2006/0129933 A1 | 6/2006 | Land et al. | |
| 2018/0032203 A1 | 2/2018 | Sepulveda et al. | |
| 2018/0331973 A1* | 11/2018 | Mani | ........................ G06F 8/65 |
| 2019/0051331 A1 | 2/2019 | Bhat et al. | |
| 2019/0121869 A1* | 4/2019 | Braunstein | ............ G06F 16/113 |
| 2019/0163469 A1 | 5/2019 | Sreenivasa et al. | |
| 2021/0397588 A1* | 12/2021 | Keller | .................. G06F 16/185 |

* cited by examiner

*Primary Examiner* — Dominic D Saltarelli

(57) ABSTRACT

An illustrative user interface (UI) remote streaming system obtains a UI dataset defining a user-customized UI that provides a client device access to multi-access edge computing (MEC) resources associated with data migration operations to be performed on tagged data resource of a plurality of data resources. Based on the UI dataset, the system streams data to and from the client device to direct the client device to present the user-customized UI to a user. When the system detects that a previously untagged data resource of the plurality of data resources becomes tagged by the user as data is streaming to and from the client device, the system changes a set of UI elements included within the user-customized UI to add an additional UI element for the newly tagged data resource. Corresponding methods and systems are also disclosed.

20 Claims, 9 Drawing Sheets

US 11,647,250 B2

METHODS AND SYSTEMS FOR REMOTE STREAMING OF A USER-CUSTOMIZED USER INTERFACE

RELATED APPLICATIONS

This application is a continuation application of U.S. patent application Ser. No. 16/926,445, filed on Jul. 10, 2020, and entitled "Methods and Systems for Remote Streaming of a User-Customized User Interface," which is hereby incorporated by reference in its entirety.

BACKGROUND INFORMATION

Remote server systems such as cloud servers, multi-access edge compute ("MEC") servers, and so forth are being relied on increasingly as many types of computer software become more complex and distributed, and come to require greater connectivity. Modern video games or extended reality experiences (e.g., virtual reality experiences, augmented reality experiences, etc.), for example, may rely on data, services, and processing resources that are distributed to various servers in various locations, rather than executing solely on a game or virtual reality console being used by a user to play the game or experience the virtual reality.

The complex and distributed nature of modern software applications may result in significant challenges for software developers who are working to create, improve, maintain, and update the complex distributed software. For example, a relatively small change made in one file can have far-reaching effects on thousands or more other files distributed on servers around the world, thus making it desirable to test and validate the effects that a given change might have. As another example, it may be difficult for software developers to anticipate how a new or modified software feature may perform on a certain device or may affect the performance of other features. As yet another example, when performing a large data migration affecting thousands of files (e.g., in which thousands of files are updated, upgraded, recompiled, compressed, and/or otherwise modified), it may be difficult for software developers to track progress of the migration and get a sense of the migration's success (e.g., including identifying files that have encountered issues during the migration).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
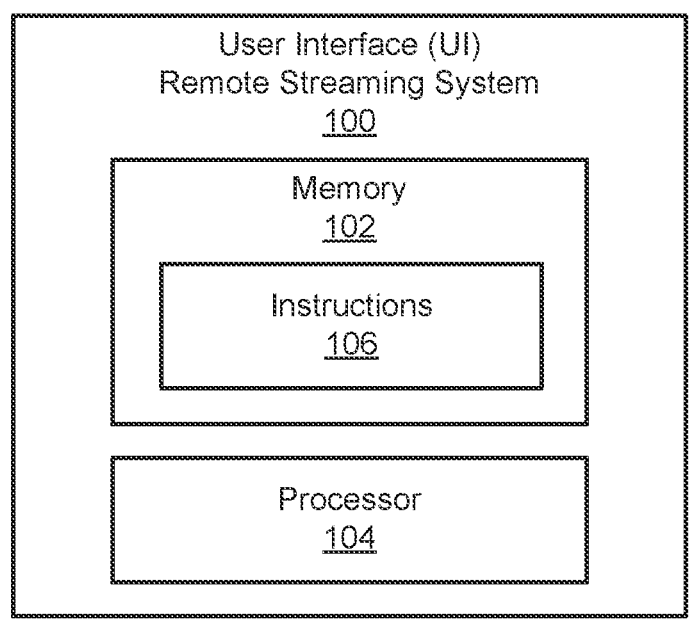
FIG. 1 shows an illustrative user-interface (UI) remote streaming system for remote streaming of a user-customized UI according to embodiments described herein.

Methods and systems for remote streaming of a user-customized user interface (UI) are described herein. Such methods and system address the challenges described above, as well as various other problems, by providing hardware and/or software support and infrastructure, communications support and infrastructure, an application programming interface (API), preconfigured and/or pretested functionality, and/or any other operational support configured to allow UI data to be streamed from a server system to a client system in an application-agnostic format.

In some examples, the server system may be a multi-access computing system such as a multi-access edge computing (MEC) server that has access to data, services, processors, memory, and/or other resources that may be useful for generating, executing, and maintaining complex distributed software. Consequently, using methods and systems described herein, software developers may conveniently create, gather, and display powerful and customizable UIs to facilitate control and management of MEC resources from any desirable client device to which data may be streamed over a network.

Methods and systems for remote streaming of user-customized UIs described herein allow various services configured to execute on a server system such as a MEC server (e.g., services to perform regression tests on large numbers of files, facilitate graphics development, validate data migrations, etc.) to be exposed to a user of a client system (e.g., a software developer, etc.) in convenient, efficient, and time saving ways. For example, rather than having to analyze thousands of lines of text from log files, or having to develop a one-off remote control panel from scratch (which may require many hours of work and input from various other team members), a software developer may, with relatively little time and effort, use systems and methods described herein to unilaterally set up a robust, dynamic, flexible, and fully customizable UI to facilitate various aspects of software development and management. This UI may allow for communication between the server and client systems, may include both input and output elements, may be platform-agnostic to function on any of various client platforms (e.g., a web browser, a mobile application, a desktop program, etc.), may be automatically and dynamically reconfigurable responsive to various factors, and/or may be customizable to accomplish any task the user may desire in any way the user chooses.

Methods and systems described herein for remote streaming of a user-customized UI may therefore provide significant benefits to server systems (e.g., MEC servers, cloud servers, other multi-access computing systems used to implement distributed software, etc.), client systems (e.g., devices used by end users of the distributed software, devices used by developers of the distributed software, etc.), network providers, and/or users of the client systems. For example, rather than relatively inefficient workflows that are used today to facilitate development and management of distributed software in which one-off web pages and software applications are built from scratch by teams of people to perform basic tasks, methods and systems described herein provide ready-made UI solutions that are efficient and convenient for users (e.g., individual users) to instantiate and modify unilaterally, and that allow full access to MEC resources and dynamic responsiveness to changing system requirements and conditions.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. UI remote streaming methods and systems described herein may provide any of the benefits mentioned above, as well as various additional and/or alternative benefits that will be described and/or made apparent below.

FIG. 1 shows an illustrative user-interface (UI) remote streaming system 100 for remote streaming of a user-customized UI according to principles described herein. System 100 may be implemented by computer resources such as servers, processors, memory devices, storage devices, communication interfaces, and so forth. For example, system 100 may be included within or otherwise associated with a MEC server or other multi-access computing system (e.g., a cloud server, a local server, etc.) configured to process distributed data, perform distributed services, and/or otherwise provide resources to client devices such as desktop or laptop computers, mobile devices, Internet of Things (IoT) devices, and so forth.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 104 (e.g., when processor 104 is directed to perform operations represented by instructions 106 stored in memory 102), system 100 may perform various functions associated with remote streaming of user-customized UIs in any manner described herein or as may serve a particular implementation.

Figure 2:
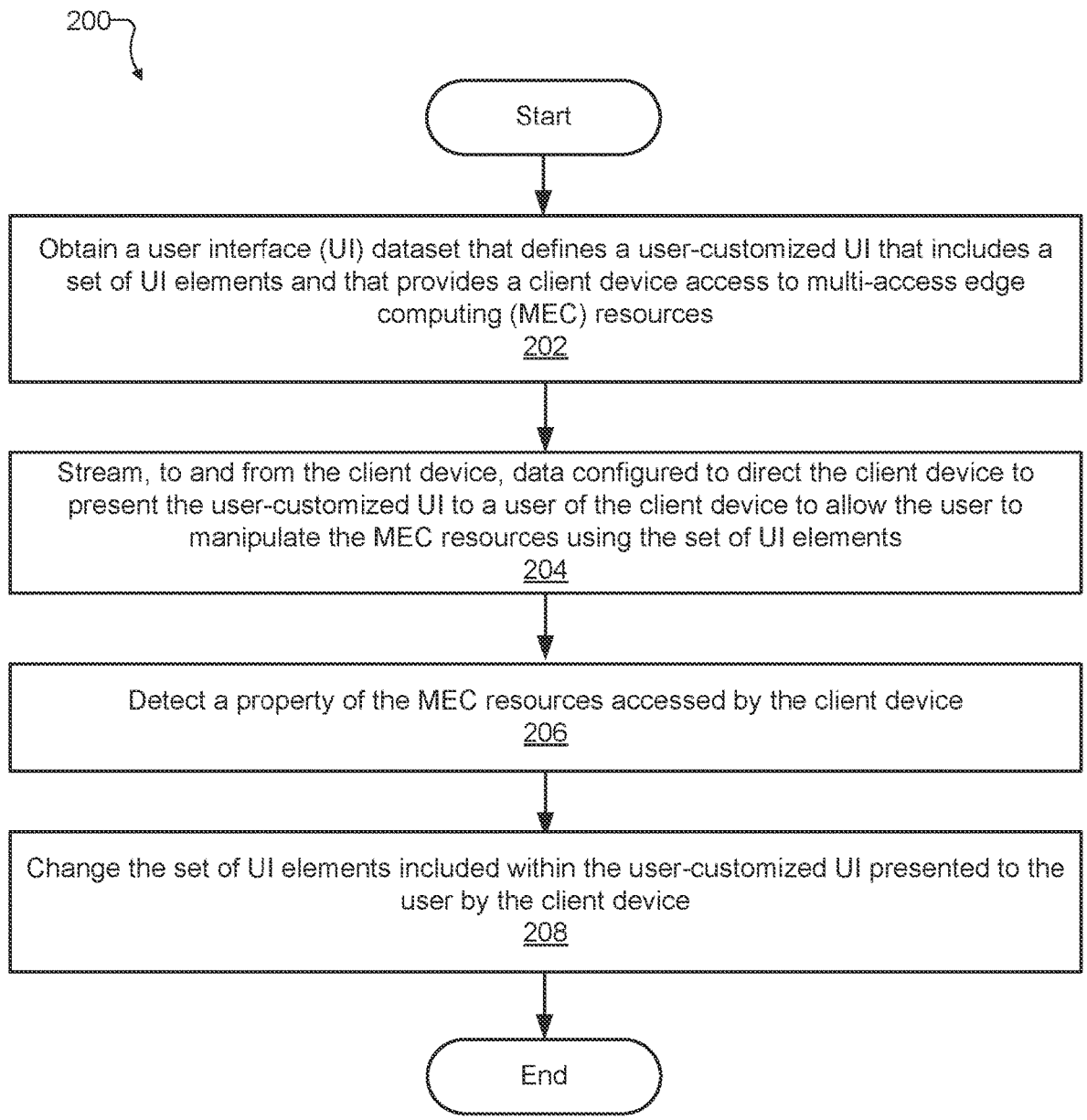
FIG. 2 shows an illustrative method for remote streaming of a user-customized user interface according to embodiments described herein.

FIG. 2 shows an illustrative method 200 for remote streaming of a user-customized UI that system 100 may perform in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a UI remote streaming system such as system 100 and/or any implementation thereof.

In some examples, the operations of FIG. 2 may be performed in real-time so as to provide, receive, process, and/or use data described herein immediately as the data is generated, updated, changed, exchanged, or otherwise becomes available. As a result, system 100 may be configured to continuously provide remote streaming of user-customized UIs based on relevant, real-time data. Real-time operations will be understood to be performed immediately and without undue delay, even if it is not possible for there to be absolutely zero delay. As will be described in more detail below, the real-time capabilities of systems and methods described herein may be enabled by low-latency network technologies such as MEC technologies, 5G provider network technologies, and so forth.

At operation 202, system 100 may obtain a UI dataset that defines a user-customized UI. For example, the UI dataset may define the user-customized UI in accordance with a remote UI API and may be generated using any of various programming languages supported by the API. The user-customized UI may include a set of UI elements such as buttons, checkboxes, text fields for text input, text boxes for text output, number input or output fields, grids and tables, slider elements, knob elements, graphics or images (e.g., still or video images), menus, status indicators (e.g. virtual LEDs, status bars, etc.), and/or any other UI elements as may serve a particular implementation. Additionally, the user-customized UI may provide access to MEC resources to the client device on which the user-customized UI is presented. For example, a button included within the user-customized UI may be configured, when clicked or pressed by a user, to initiate one or more services provided by a MEC server (e.g., to move, rename, and rebuild a particular file accessible to the MEC server, etc.). As another example, a status indicator included within the user-customized UI may be configured to indicate a status or property of the MEC resources (e.g., to indicate that the services have been performed successfully, to display data accessed by the MEC server, etc.). To this end, and as will be described in more detail below, the UI dataset obtained at operation 202 may include information indicative of which UI elements are to be included in the set, how the UI elements are to be laid out, which MEC resources each UI element is to control or represent, and so forth.

At operation 204, system 100 may stream data to and from the client device based on the UI dataset. The streaming data may be configured to direct the client device to present the user-customized UI to a user of the client device. For example, the user may be a software developer who is developing or managing (e.g., maintaining, updating, modifying, testing, etc.) distributed software that utilizes the MEC server (e.g., by executing on processors and/or memory of the MEC server, by relying on data stored within or accessible to the MEC server, etc.). The client device may be at least somewhat remote from the MEC server and may be implemented as a computer or other device used by the developer to perform these tasks. By streaming the data at operation 204 to direct the client device to present the user-customized UI, system 100 may allow the user to manipulate the MEC resources using the set of UI elements. For example, as described above, the user may press a button or move a slider to initiate a process or change a parameter being used by the MEC server, or the developer may gain visibility into status of MEC resources by seeing graphics, text, and/or status indicators that are presented as part of the user-customized UI.

At operation 206, system 100 may detect a property of the MEC resources accessed by the client device. The property detected at operation 206 may be any property as may serve a particular implementation and may relate to any MEC resource in any suitable way. For example, system 100 may detect that a particular data resource (e.g., a file) that was previously unselected has now been selected or marked by a user. As another example, system 100 may detect that a service for a particular graphical element has been activated as a result of the graphical element entering a scene that is being processed or rendered for a video game or extended reality experience. As yet another example, system 100 may detect that a weather-monitoring service accessible to the MEC server is indicating that rain or wind in the environment surrounding the client device has begun or has exceeded a threshold. In some examples, the detecting of the property at operation 206 may be performed while the streaming data is being streamed to and from the client device. In this way, dynamic changes to the user-customized UI may be made to reflect the changing conditions being experienced or created by the user (e.g., the changing conditions that the detected property represents or indicates).

At operation 208, system 100 may change the set of UI elements included within the user-customized UI presented to the user by the client device. As mentioned above, this change may be performed based on the detecting of the property at operation 206 and may be performed dynamically while the streaming data is being streamed to and from the client device. The dynamic change may hence also be performed while the streaming data is being streamed to and from the client device. In this way, the user-customized UI may be highly responsive to changing conditions, not only by displaying updated status and so forth, but by dynamically reconfiguring which UI elements (e.g., buttons, sliders, output fields, etc.) are presented within the UI in accordance with the changing conditions. In some examples, the changes and updates associated with operation 208 may be performed dynamically several times per second (e.g., 40 times per second, etc.) so as to provide a continuously relevant and up-to-date UI to the user as conditions with the user, the MEC resources, and/or distributed software executing by way of the MEC server change and evolve.

While method 200 of FIG. 2 represents an example implementation of a UI remote streaming method involving a single client device, it will be understood that system 100 may perform UI remote streaming operations such as those illustrated in FIG. 2 for several client devices at once. In certain such implementations, system 100 may employ individual downstream, one-to-one connections (such as described for method 200) for each different client device. In other such implementations, system 100 may employ a daisy-chained connection or use another suitable communication technique to exchange messages with the plurality of client devices. For example, communications between system 100 and the client devices may be carried out by sending data in a linked loop of systems that includes system 100 and each of the client device. As data travels around the loop, each client device may receive streaming data relevant to a UI it is providing and may insert data into the loop that will be communicated back to system 100. In still other examples, system 100 may perform streaming communications to and from one or more client devices using any other methods or communication techniques as may serve a particular implementation.

Figure 3:
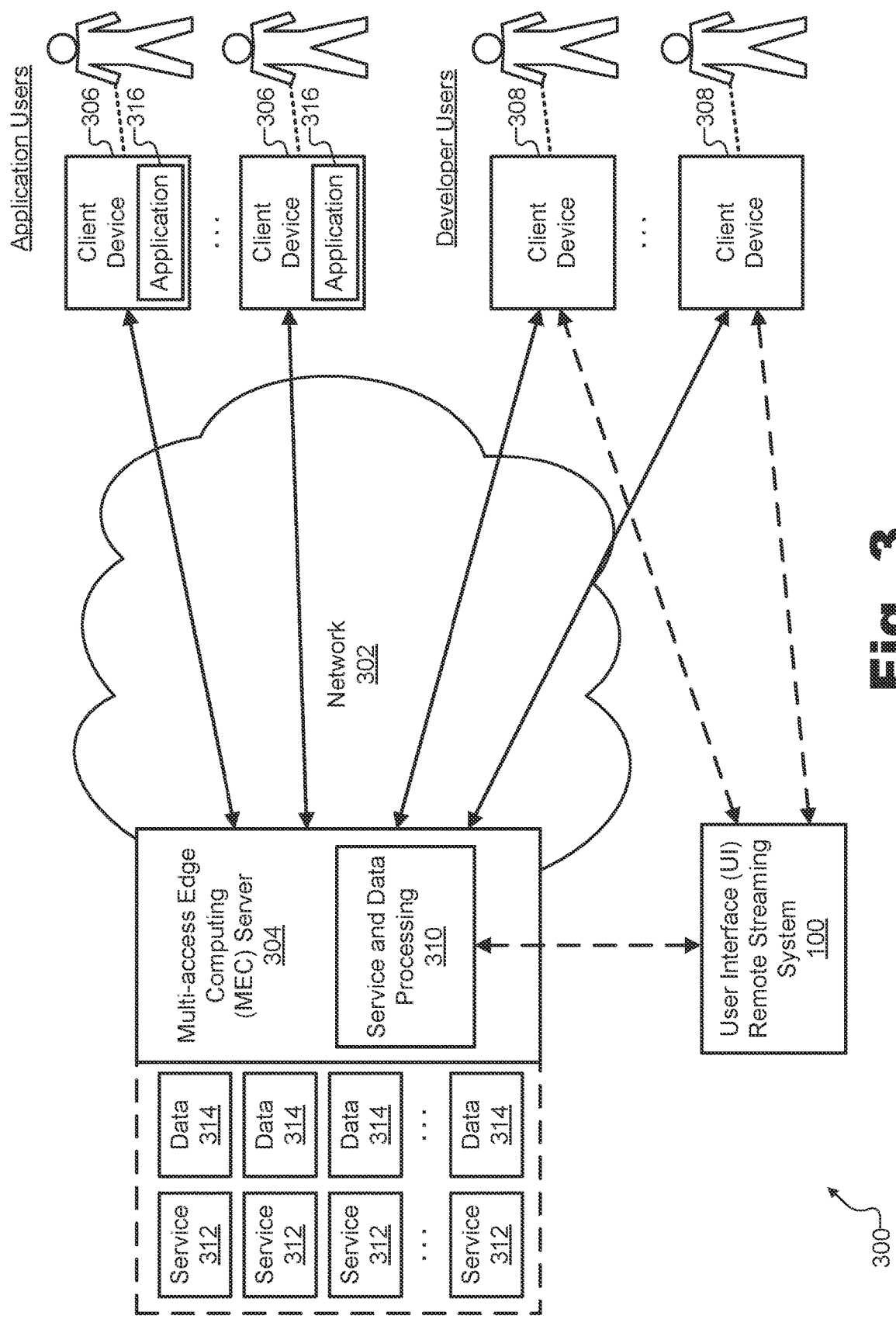
FIG. 3 shows an illustrative configuration for multi-access edge computing (MEC) resource management according to embodiments described herein.

FIG. 3 shows an illustrative configuration 300 for MEC resource management. Specifically, as shown, a network 302 connects a MEC server 304 with several client devices 306 being used by respective application users (e.g., end users of applications such as video games, extended reality experiences, and/or other distributed software applications) and with several client devices 308 being used by respective developer users (e.g., software developers or other people involved in creating and/or managing the applications being used by the application users). Each of the elements of configuration 300 will now be described in more detail.

Network 302 may include or be implemented by one or more networks including a provider network and one or more other networks external to the provider network such as, for example, local area networks, wide area networks, the Internet, and so forth. A provider network included within network 302 may provide, for each client device (e.g., client devices 306 and 308), communication access to servers and other network resources (e.g., MEC server 304), as well as communication access to other networks such as the Internet. The provider network may be implemented by a provider-specific wired or wireless communications network (e.g., a cellular network used for mobile phone and data communications, a 5G network or network of another suitable technology generation, a cable or satellite carrier network, a mobile telephone network, etc.), and may be operated and/or managed by a provider entity such as a mobile network operator (e.g., a wireless service provider, a wireless carrier, a cellular company, etc.). The provider of such a provider network may own or control all of the elements necessary to provide and deliver communications services for client devices such as client devices 306 and/or 308, including radio spectrum allocation, wireless network infrastructure, back haul infrastructure, customer care, provisioning of devices, network repair for the provider network, and so forth.

Along with the provider network, network 302 may also be understood to incorporate interconnected network infrastructure outside of the provider network and outside of the control of the provider. For example, network 302 may include one or more of the Internet, a wide area network, a content delivery network, and/or any other suitable network or networks managed by any third parties outside of the control of the provider of the provider network. Both the provider network and any other networks incorporated within network 302 will be understood to provide data delivery between server-side systems such as MEC server 304 and client-side systems and devices such as client devices 306 and/or 308. To this end, network 302 may implement or employ any suitable communication technologies, devices, media, protocols, or the like as may serve a particular implementation.

MEC server 304 may be implemented by one or more servers or other computing devices or systems that are associated with a provider network of network 302 and are configured to perform multi-access edge computing tasks on demand for client devices such as client devices 306 and/or 308. MEC server 304 is shown to be on an edge of network 302 to indicate that MEC server 304 may be integrated with network 302. In particular, MEC server 304 may be provided as part of the provider network to facilitate the performance of on-demand, processing-intensive, latency-sensitive tasks for client devices served by the provider network. In some examples, MEC server 304 may be communicatively coupled to other multi-access servers (e.g., cloud servers or the like that are not explicitly shown in FIG. 3) that are not integrated with the provider network but, rather, are accessible to server 304 and/or the client devices by way of the Internet or other networks external to the provider network.

In FIG. 3, MEC server 304 is shown to include service and data processing 310. Service and data processing 310 may receive and fulfill requests (e.g., requests from client devices, from other MEC servers, or from other suitable systems) that are made with respect to a plurality of services 312 and instances of data 314 (e.g., files, data repositories, etc.) that are accessible to MEC server 304. Services 312 and instance of data 314 may be referred to herein as MEC resources (e.g., MEC resources 312 and 314).

Each service 312 may represent a service that is performed by or under direction of MEC server 304, and that is manipulable by the user when a user action causes the service to be performed. For example, each service 312 may represent a task that MEC server 304 is programmed to carry out itself or that MEC server 304 is configured to direct another computing system (e.g., another MEC server, a cloud server, a client device, etc.) to perform. Certain services 312 may be performed using data received from a requestor of the service (e.g., data or parameters included as part of the service request) or using one or more instances of data 314 that are accessible to MEC server 304 (e.g., stored within memory or storage resources of MEC server 304 itself or stored elsewhere and accessible to MEC server 304 by way of network 302). As will be described in more detail below, examples of services 312 may relate to tasks involving data migration, graphics rendering, system and data health monitoring, and/or various other tasks that MEC server 304 may be involved with.

Each instance of data 314 may represent a data resource that is accessible by way of MEC server 304 and that is manipulable by a user when a user action causes the data resource to be accessed, changed, or expanded. For example, each instance of data 314 may represent a particular file, a group of files, a storage repository or data store (e.g., a database, etc.), or any other collection of data as may serve a particular implementation.

MEC server 304 may include sufficient computing power (e.g., including substantial memory resources, substantial storage resources, parallel CPUs, parallel GPUs, etc.) to implement a distributed computing configuration wherein devices and/or systems (e.g., including, for example, client devices 306 and/or 308) can offload certain computing tasks to be performed by the powerful resources of the MEC server. While MEC server 304 is shown to be a MEC server, it will be understood that principles described herein may also be applied to other types of multi-access servers associated with other networks or types of networks. For example, another type of multi-access server that may benefit from methods and systems for remote streaming of user-customized UIs may be a cloud-based multi-access server (a cloud server) that is implemented external to a provider network included within network 302 by a party other than the provider of the provider network. Other types of multi-access servers that do not precisely implement cloud servers or MEC servers as described herein may also be used in certain implementations.

The MEC resources of MEC server 304 (e.g., services 312 and data 314) may be performed and managed by processing and data storage hardware and software that is included within or otherwise accessible to MEC server 304 and that will be referred to herein as processing and/or data storage resources of MEC server 304. These processing and/or data storage resources may be significant and powerful in comparison with the resources of any given client device communicatively coupled to MEC server 304. This is particularly true when it is considered that, at least for certain services 312, MEC server 304 may harness the power not only of its own local processing and storage resources, but also of other processing and storage resources that are accessible to MEC server 304 (e.g., processing and storage resources of other MEC servers, cloud servers, etc., that are not explicitly shown in FIG. 3) when performing one of services 312 or providing or manipulating an instance of data 314.

Client devices 306 and 308 may be implemented by any suitable computing devices or systems as different types of users may employ to access the power of the MEC resources offered by MEC server 304. For instance, certain examples of client devices 306 and/or 308 may be implemented as multi-purpose or general-purpose devices such as mobile devices (e.g., smartphones, tablet computers, etc.), consumer or enterprise computers (e.g., laptop computers, desktop computers, servers, etc.), or other suitable systems or devices. While respective pluralities of both client devices 306 and client devices 308 are shown in FIG. 3, it will be understood that a particular configuration may include any suitable number of each type of client device (e.g., as few as zero and as many as hundreds or more of each type of client device).

Client devices 306 are shown to be used by respective application users and, as such, are each shown to include a respective application 316 that the application user has chosen to execute. For example, each application 316 may represent a video game application that relies on MEC resources (e.g., services 312, data 314, etc.) in order to operate properly or another suitable type of MEC-based application (e.g., an extended reality application, etc.). As such, the application users of client devices 306 may not be concerned about details of how applications 316 operate, which services 312 and/or data 314 each application 316 relies on, what data is transferred between client devices 306 and MEC server 304, and so forth.

In contrast, client devices 308 are shown to be used by respective developer users who may be involved in creating content, generating or improving distributed software applications such as applications 316, managing MEC server 304, generating or managing MEC resources 312 or 314, or the like. Developer users may therefore be more interested in the details ignored by application users such as details related to operation of services 312 and status of data 314. In certain scenarios, the developer users of client devices 308 may wish to directly monitor and manipulate the MEC resources of MEC server 304 as the developer users develop and manage applications such as application 316.

For either type of client device (e.g., client device 306 or 308) and either type of user (e.g., application user or developer user), the powerful capabilities offered by the MEC resources 312 and 314 of MEC server 304 may provide significant benefits. For example, when needed for one task, a client device may access hundreds of processor cores that can process data from thousands of files, then, when that task is complete, the client device may release those processor cores to be used for other purposes such as to fulfill requests of other client devices. One conventional challenge of handling such powerful shared resources, however, has been an absence of an easy or convenient way to allow users (and especially developer users who are tasked with directly changing, testing, managing, and/or otherwise manipulating the MEC resources) to interface with and manage the MEC resources. For example, if a developer user has wanted to manipulate MEC resources conventionally (e.g., by moving or updating instances of data 314, by testing or altering services 312, etc.), the user has needed create a one-off application or web page to interface with the MEC resources. Designing such interfacing can be extremely time-consuming, repetitive, and inefficient, and may tend to slow down the development process and/or inconvenience multiple people whose input and expertise is needed to create the different parts of the interface (e.g., UI developers, web communication specialists, infrastructure experts, MEC service developers, etc.).

To address these challenges, FIG. 3 shows dotted lines representing an alternative dataflow that, rather than requiring a one-off application or web page for direct communications between client devices 308 and MEC server 304, employs an implementation of system 100 to remote stream a user-customized UI to handle communications related to MEC resources 312 and 314. System 100 may be implemented within MEC server 304 (e.g., by hardware and/or software resources of MEC server 304), as a separate system on the edge of network 302, as a standalone system communicatively coupled to MEC server 304 (e.g., by way of network 302), or in any other manner as may serve a particular implementation. Regardless of which resources are used to implement system 100, system 100 may be communicatively coupled to client devices 308 so as to facilitate interfacing between client devices 308 (e.g., the developer users of client devices 308) and MEC resources 312 and 314. While direct communications between system 100 and client devices 308 are illustrated by the dotted lines in FIG. 3, it will be understood, as has been mentioned, that other styles of communication (e.g., a daisy-chained loop, etc.) that are less direct than illustrated by these arrows may be employed in certain implementations. Additionally, it will be understood that in certain examples (not explicitly shown), system 100 may also be communicatively coupled with one or more client devices 306 to perform a similar function for examples in which it is desirable to provide application users opportunities to directly interface with certain MEC resources.

Figure 4:
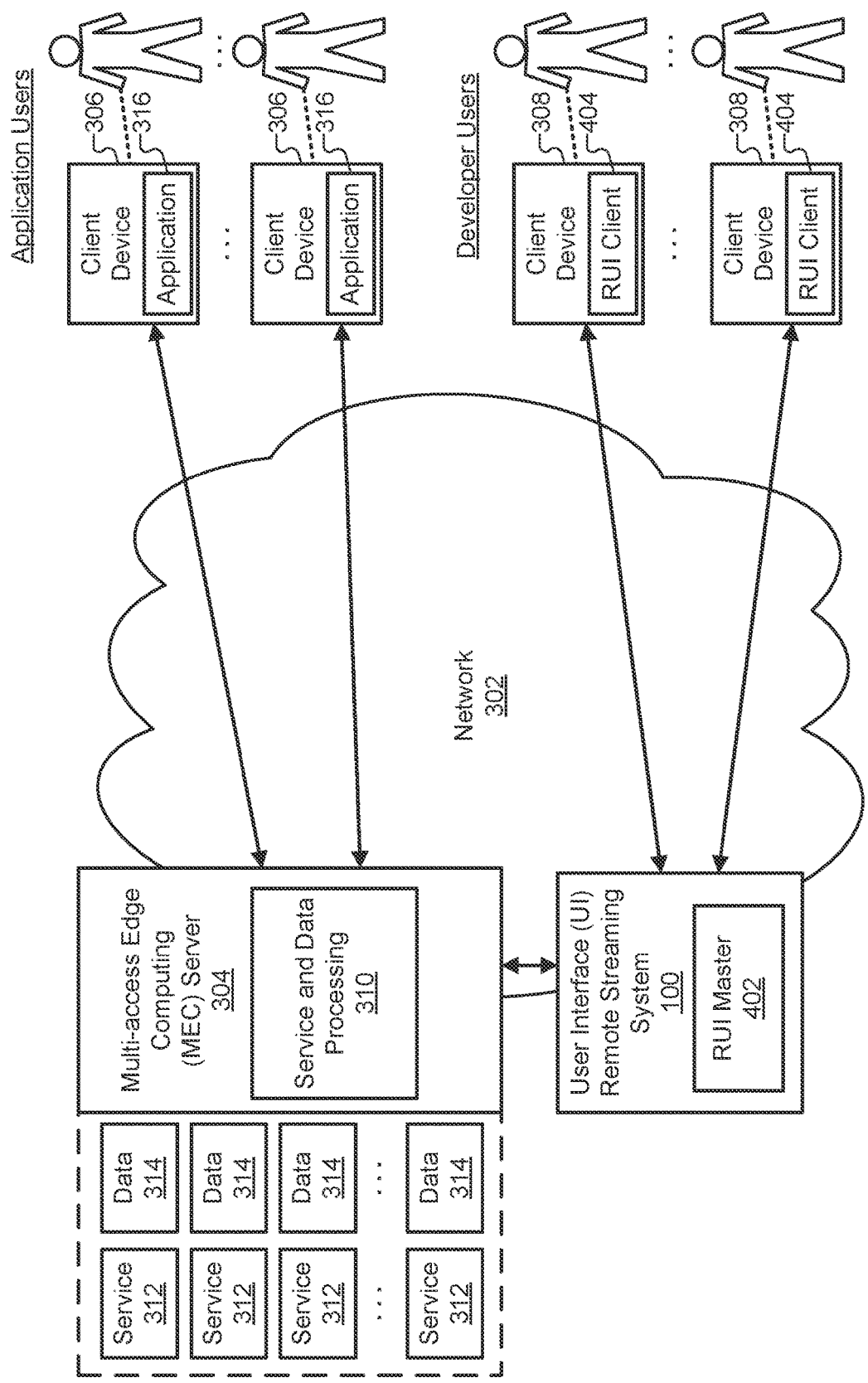
FIG. 4 shows an illustrative configuration for MEC resource management that employs a UI remote streaming system according to embodiments described herein.

FIG. 4 shows an illustrative configuration 400 for MEC resource management that employs a particular implementation of system 100 that is illustrated as a separate system from MEC server 304 on the edge of network 302. In this example, the communications between client devices 308 and system 100 and between system 100 and MEC server 304 are illustrated with solid arrows, while the alternative arrows signifying direct communication between client devices 308 and MEC server 304 have been removed. Accordingly, it will be understood that, for configuration 400, system 100 may handle and facilitate all communications between client devices 308 and MEC server 304 that are related to MEC resources 312 and 314. Additionally, in order to facilitate interfacing between MEC server 304 and client devices 308, FIG. 4 shows that system 100 may be configured to execute a remote UI (RUI) master 402 that is configured to stream UI data to respective RUI clients 404 implemented on client devices 308.

RUI master 402 may be generated based on a UI dataset that defines a user-customized UI that provides client devices (e.g., client device 308) access to MEC resources (e.g., services 312 and/or instances of data 314). For example, rather than building a one-off application or website as developer users may have done conventionally (as described above in relation to FIG. 3), developer users may use an API associated with system 100 to quickly develop and conveniently maintain RUI master 402. For example, if a developer user wishes to have insight into a particular instance of data 314 or wishes to control a particular service 312, the developer user may conveniently generate RUI master 402 with one UI element (e.g., a text or graphics box that renders the data 314) to provide the desired information about data 314 and another UI element (e.g., a button or checkbox) to allow the service 312 to be initiated and otherwise controlled.

RUI master 402 may be configured to handle all the communication between system 100 and service and data processing 310 (e.g., to submit and process MEC resource requests), as well as all the web interaction between system 100 and client devices 308. For example, RUI master 402 may send a set of instructions for a client device 308 to build a respective user-customized UI within a RUI client 404 that is loaded on the client device 308 and configured to interoperate with RUI master 402. RUI client 404 may be implemented as a standalone application (e.g., a mobile application, a desktop application, etc.) or as a web-based application that is specifically configured to execute on whatever computing platform a particular client device 308 implements. For example, one RUI client 404 may be configured for a certain mobile operating system (e.g., iOS, Android, etc.), another RUI client 404 may be configured as a standalone application for a desktop operating system (e.g., Windows, Linux, etc.), another RUI client 404 may be configured to execute within a particular web browser (e.g., Chrome, Safari, etc.), another RUI client 404 may be configured to execute within another application (e.g., Excel, etc.), and so forth.

As long as a particular client device 308 has a compatible RUI client 404 installed to act as a UI "player", RUI master 402 may stream data to and from the client device 308 to direct the client device to present the user-customized UI to the user to thereby allow the user to manipulate the MEC resources using the UI elements that have been set up in RUI master 402. Even if the user wishes to switch to a different client device 308 (e.g., to switch from a mobile device to a laptop computer, etc.) the RUI master 402 may remain unaffected and able to support a RUI client 404 on the later client device just as the RUI client 404 of the earlier client device was supported (e.g., rather than requiring a new one-off application to be created for the computing platform of the later client device to which the user switched over).

As one example of how RUI master 402 and an implementation of RUI client 404 may operate, the developer user may click a button displayed in the RUI client 404 of his or her client device 308 to manipulate a desired service 312, and system 100 may handle all the button click events, network communications over network 302, requests for service and data processing 310, and so forth. In this way, the developer user is free to focus on accomplishing his or her work rather than spending an inordinate amount of time and effort trying to manipulate the desired service 312 by conventional and inconvenient means.

A single RUI master 402 is shown in configuration 400 together with a plurality of RUI clients 404 executing on different client devices 308. In some examples, it will be understood that system 100 may provide the same (or a similar) user-customized UI from this RUI master 402 to several different RUI clients 404 executing on different client devices 308. In other examples, multiple RUI masters 402 may be generated to provide different user-customized UIs to different RUI clients 404 on different client devices (or to multiple different RUI clients 404 executing on the same client device).

System 100 may perform the streaming of the user interface data to client devices 308 in any suitable manner. For example, the streaming may be performed over a socket using a full-duplex messaging queue to allow simultaneous data transmission from system 100 to each client device 308 and from each client device 308 to system 100. Because system 100 is already configured to set up this socket and send the proper messages between RUI master 402 and RUI clients 404, developer users may not need to worry about implementing such details but rather may conveniently be up and running with a functional UI after indicating which UI elements are desired (e.g., buttons, text boxes, etc.) and which MEC resources 312 and/or 314 each UI element is to manipulate or represent.

In certain examples, one user action (e.g., the clicking of one button within the user-customized UI, etc.) may be configured to initiate a sequence of actions performed by MEC server 304. For example, the MEC resources associated with a particular UI element may include a first service and a second service each performed by or under direction of MEC server 304. In this example, system 100 may detect a user action (e.g., a button click, etc.) performed by the user of a client device with respect to the particular UI element within the user-customized UI, and may direct, in response to the user action, the first service and the second service to be performed in sequence by or under direction of MEC server 304. In this way, for example, a single button click may cause manipulation of many instances of data 314 (e.g., the migration of a large number of files, etc.) and/or the performance of various different services 312, and the output presented to the user may be as simple as a green light within the user-customized UI that indicates that the MEC resources have been manipulated successfully (e.g., that the data migration is complete, etc.). In other examples, user-customized UIs may include more UI elements to provide the user greater control and visibility into the process (e.g., checkboxes for each instance of data 314 that are automatically checked as files are successfully migrated; buttons allowing for tests to be paused, skipped, or redone, etc.).

Various aspects of the user-customized UIs remotely streamed to client devices by system 100 will now be described in relation to FIGS. 5-8.

Figure 5:
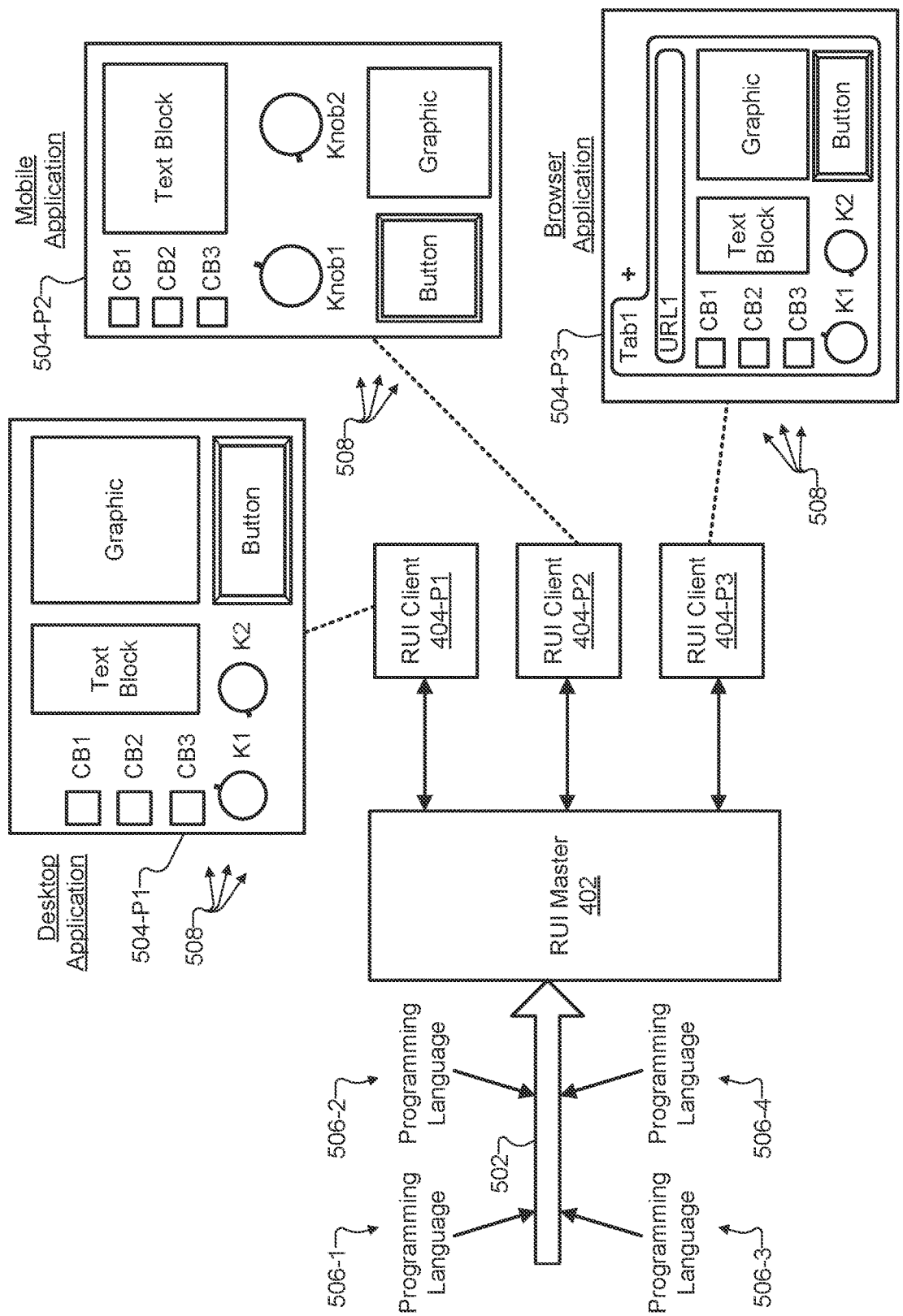
FIG. 5 shows illustrative user-customized UIs presented by different remote user-interface (RUI) clients based on streaming data received from a RUI master according to embodiments described herein.

FIG. 5 shows illustrative user-customized UIs presented by different RUI clients 404 (e.g., RUI clients 404-P1 through 404-P3, representing different RUI clients executing on different computing platforms) based on streaming data received from a RUI master 402, such as described above in relation to FIG. 4. As shown, system 100 may generate RUI master 402 based on a UI dataset 502 that defines one or more user-customized UIs 504 (e.g., user-customized UIs 504-P1 through 504-P3) in accordance with an API that supports a plurality of different programming languages 506 (e.g., programming languages 506-1 through 506-4). For example, a developer user (or other suitable user who desires to interface with MEC resources in any of the ways described herein) may create UI dataset 502 in accordance with a predefined API that provides a set of rules to facilitate fast and convenient programming of RUI master 402. The API may define various types of function calls or requests that may be made to instantiate different types of UI elements, how to make such function calls or requests, data formats and conventions that are to be complied with, and so forth. System 100 may provide infrastructure (e.g., MEC request protocols, message queueing, network communications, etc.) to implement the user-customized UI defined by UI dataset 502 based on the API.

Rather than requiring a particular programming language 506, the API may be configured to support various different programming languages 506 that may be useful by different programmers with different skill sets and/or may be useful for programming different types of user-customized UIs. For example, programming languages 506 may be implemented by established programming languages such as C, C++, Java, Python, Typescript, Go, XML, or any other general-purpose, scripting, object-oriented, markup, or other type of programming language as may serve a particular implementation and as may be supported by the API. Certain programming languages 506 may also be implemented by custom programming languages or protocols defined by the API itself. In this way, various types of developer users may be enabled to generate UI datasets defining desired user-customized UIs according to their own preferences and proficiency with computer programming. For instance, software developers and non-programmers alike (e.g., artists and other content creators, etc.) may be enabled to generate their own user-customized UIs.

As mentioned above with respect to FIG. 4, RUI master 402 may stream UI data to multiple client devices at once, rather than being limited to a single client device. Specifically, for example, system 100 may stream data to and from a first client device 308 while also streaming additional data to and from a second client device 308 based on the same UI dataset 502. While the data streamed to the first client device 308 directs the first client device to present one version of the user-customized UI to a first user, the additional data streamed to the second client device 308 directs the second client device 308 to present a different version of the user-customized UI to a second user. In this way, both the first and second users are able to manipulate the MEC resources using respective sets of UI elements 508 that are included in the different versions of the user-customized UI that are presented to the users.

In some examples, the sets of UI elements 508 may be the same for multiple RUI clients 404. For example, as shown by the respective user-customized UIs 504 associated with RUI clients 404 in FIG. 5, each user-customized UI 504 includes a set of UI elements 508 that includes three checkbox elements (CB1 through CB3), a text block element (Text Block), a graphic element (Graphic), two knob elements (Knob1 and Knob2 or K1 and K2), and a button element (Button). In such examples, the user may be presented with the same UI controls and visibility regardless of which computing platform he or she uses (e.g., regardless of which type of RUI client 404 is used). In other examples, the set of UI elements 508 included within a user-customized UI 504 for one RUI client 404 may be different from the set of UI elements 508 included within a user-customized UI 504 for another RUI client 404. For example, if a monitor associated with a desktop computing platform is known to have more display space than a screen associated with a mobile computing platform, RUI master 402 may automatically stream more UI elements 508 (e.g., more buttons, more checkboxes, etc.) to the desktop-based RUI client than to the mobile-based RUI client.

In implementations in which multiple RUI clients 404 are served by a single RUI master 402, different RUI clients 404 may execute on different computing platforms. For example, a first client device may be associated with a first computing platform and may present the user-customized UI to the user by way of a UI client (e.g., a UI streaming player) that is configured for the first computing platform, while a second client device may be associated with a second computing platform (e.g., a platform different from the first computing platform) and may present the user-customized UI (e.g., the same or a different version of the user-customized UI) to the second user by way of a UI client that is configured for the second computing platform.

To illustrate, FIG. 5 shows a desktop computing platform that is associated with RUI client 404-P1 and user-customized UI 504-P1, and is labeled "Desktop Application." As shown, the desktop computing platform may be configured to be presented on a computer monitor, and the various UI elements 508 are situated accordingly within user-customized UI 504-P1. As another example, FIG. 5 shows a mobile computing platform that is associated with RUI client 404-P2 and user-customized UI 504-P2, and is labeled "Mobile Application." As shown, the mobile computing platform may be configured to be presented in portrait mode on a mobile device screen, and the various UI elements 508 are arranged accordingly within user-customized UI 504-P2. As yet another example, FIG. 5 shows a browser computing platform that is associated with RUI client 404-P3 and user-customized UI 504-P3, and is labeled "Browser Application." As shown, the browser computing platform may be configured to be presented within a web browser (e.g., on a particular tab (Tab1) that is presenting web content at a particular URL (URL1)), and the various UI elements 508 of user-customized UI 504-P3 are arranged accordingly within the tab of the browser. In any of these examples, RUI master 402 may stream the same UI data representative of the user-customized UI 504 to be presented and RUI master 402 may be agnostic to what platform will be presenting the user-customized UI (as long as there is a RUI client available and installed for the intended platform).

Figure 6:
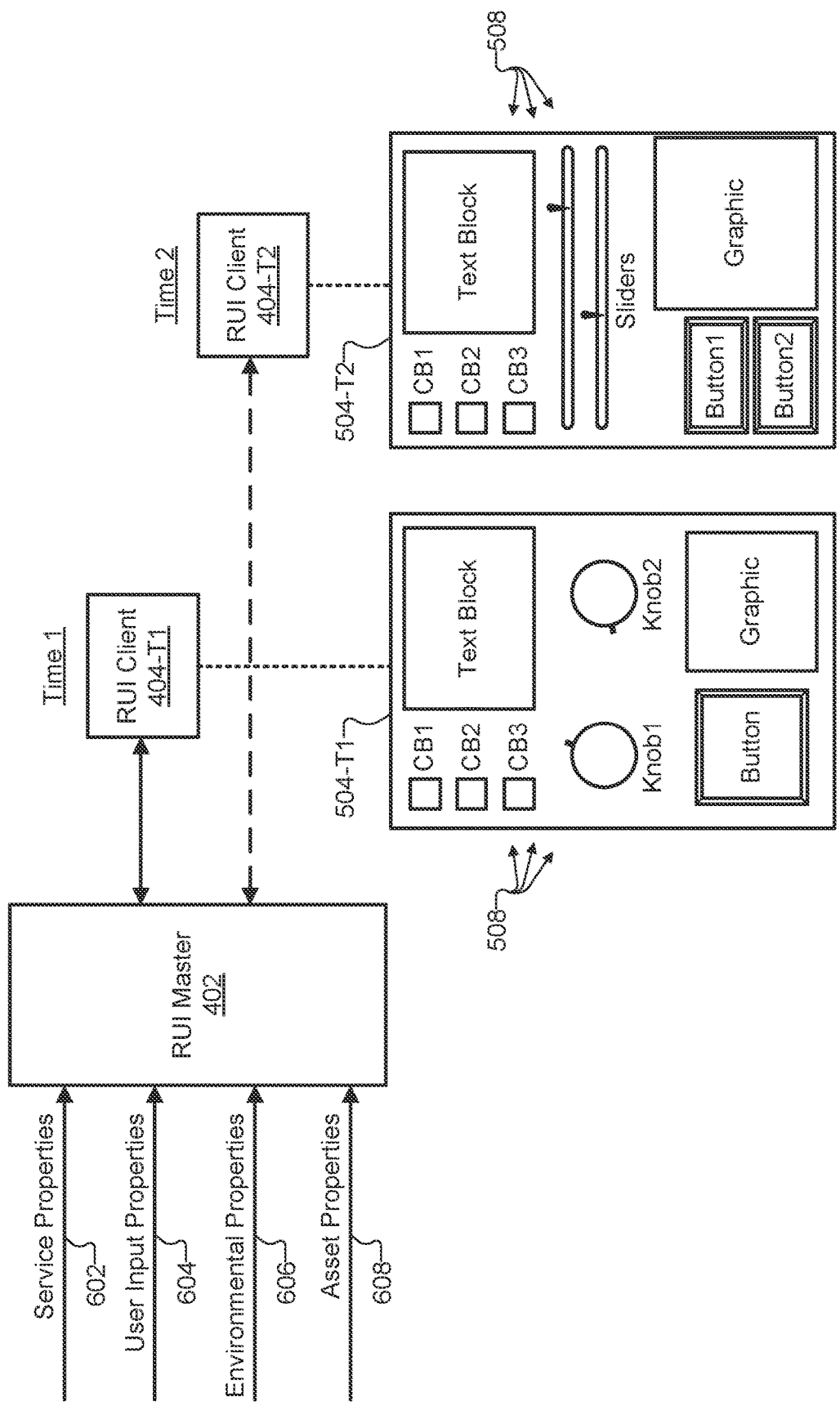
FIG. 6 shows illustrative user-customized UIs presented at different times by a RUI client based on streaming data received from a RUI master according to embodiments described herein.

FIG. 6 shows illustrative user-customized UIs presented at different times by a RUI client 404 (shown as RUI client 404-T1 at a first time, Time 1, and as RUI client 404-T2 at a second time, Time 2) based on streaming data received from a RUI master 402. FIG. 6 illustrates how system 100 may, over time, dynamically change the set of UI elements 508 included within a user-customized UI 504 presented to a user by a client device. Specifically, as shown, RUI client 404 (i.e., labeled RUI client 404-T1 at Time 1) may present a first version of user-customized UI 504 labeled user-customized UI 504-T1 at Time 1, then, at Time 2, RUI client 404 (i.e., labeled RUI client 404-T2 at Time 2) may present a second, different version of user-customized UI 504 labeled user-customized UI 504-T2.

As shown, the two different versions of user-customized UI 504 have different UI elements 508 in their respective sets of UI elements (e.g., rather than merely having certain UI elements 508 being rearranged, updated, or changed to show different text or graphics or the like). At Time 1, for example, user-customized UI 504-T1 is shown to have a single button (Button) and two knobs (Knob1 and Knob2) whereas, at Time 2, user-customized UI 504-T2 is shown to have been dynamically changed to have two buttons (Button1 and Button2) instead of one, and to have two slider elements (Sliders) in place of the knobs of user-customized UI 504-T1. Other UI elements such as three checkboxes (CB1 through CB3), a text output element (Text Block), and an image output element (Graphic) are present in both versions of user-customized UI 504, although it is noted that the image output element has been dynamically changed to be larger at Time 2 than it was at Time 1.

System 100 may direct RUI master 402 to dynamically change the set of UI elements 508 of the user-customized UI 504 being presented by RUI client 404 for any suitable reason or based on any suitable criteria. For example, while the streaming data is being streamed to and from the client device (e.g., while UI data is streaming between a RUI master 402 and a RUI client 404), system 100 may detect a property of the MEC resources accessed by the client device and may direct the dynamic change in the user-customized UI based on the detected property while the streaming data is still being streamed to and from the client device.

Various such properties 602-608 are shown in FIG. 6 to be accounted for by RUI master 402 when determining whether to dynamically change user-customized UI 504. For example, service properties 602 may represent the current status of, or detected changes to, one or more of services 312 that are being manipulated by the user by way of user-customized UI 504. There may be hundreds of services 312 that may be controlled by various types of UI elements 508, so if one service 312 is performed and a different service 312 is initiated or the needs of a service 312 change, it may be more appropriate to have, for example, sliders instead of knobs or two buttons instead of one. Accordingly, system 100 may direct RUI master 402 to continuously be kept up to date with an optimal set of UI elements 508 and, as shown from Time 1 to Time 2, RUI master 402 may stream UI data that ensures that RUI client 404 also presents the most up-to-date set of UI elements. In some examples, this changing of the set of UI elements 508 may happen dynamically and in real time with updates as often as may be desired by or appreciable to a user (e.g., up to several times per second in certain examples). As such, it would be impossible for such updates to be made by conventional means (e.g., in which a user manually adds the extra button or replaces the knobs for sliders, etc.).

User input properties 604 represent any criteria related to user input provided by a user in relation to any MEC resources (e.g., services 312, data 314, etc.) that are being manipulated. For example, if the user indicates that he or she wishes to manually control a particular aspect (e.g., a variable, etc.) of a service 312 that was automatically controlled previously, an additional control UI element (e.g., a button, knob, slider, number field, etc.) may be automatically and dynamically added to user-customized UI 504 to give the user that option. As another example, if the user indicates that he or she wishes to have textual or graphical visibility into a particular instance of data 314 that was not previously visible, an additional textual or graphical UI element may be automatically and dynamically added to user-customized UI 504 to provide that visibility. As another example, the user may choose from different modes for the user-customized UI 504 to operate in (e.g., a basic mode, an advanced mode, etc.) and these modes may be associated with different sets of UI elements 508 that automatically populate within user-customized UI 504 upon selection of the mode.

Environmental properties 606 may represent real-time environmental factors that may play into certain types of applications. For example, an augmented reality application may be influenced by weather surrounding the user. As such, environmental properties may indicate that a certain level of rain or sun or wind or other factors have been detected such that status and controls related to how these environmental factors are accounted for by the application may be dynamically added to user-customized UI 504.

Asset properties 608 may represent various assets that may be integrated into an application but that may dynamically change. For example, a 3D graphics rendering application may present various instances of objects (e.g., people, animals, etc.) that are capable of dynamic movement such that the objects can enter or leave the scene as 3D graphics for the scene are being rendered. Such properties may trigger system 100 to dynamically add or remove UI elements corresponding to objects that are present at the scene while not cluttering user-customized UI 504 with UI elements associated with objects that are not presently included within the scene being rendered.

Properties 602-608 illustrated in FIG. 6 represent a few illustrative properties that may be considered by system 100 when changing (or determining not to change) the set of UI elements included within a user-customized UI. However, it will be understood that properties 602-608 are only shown for illustrative purposes and that system 100 may account for any suitable properties of MEC resources being accessed by a client device when determining whether to change the set of UI elements. Additionally, while specific changes to the set of UI elements 508 are illustrated in FIG. 6 (e.g., replacing knobs with sliders, adding a button, etc.), it will be understood these changes are only examples and that system 100 may change a user-customized UI in any manner as may serve a particular implementation and/or as may be desired by a user (e.g., a develop user) who generates the UI dataset.

Figure 7:
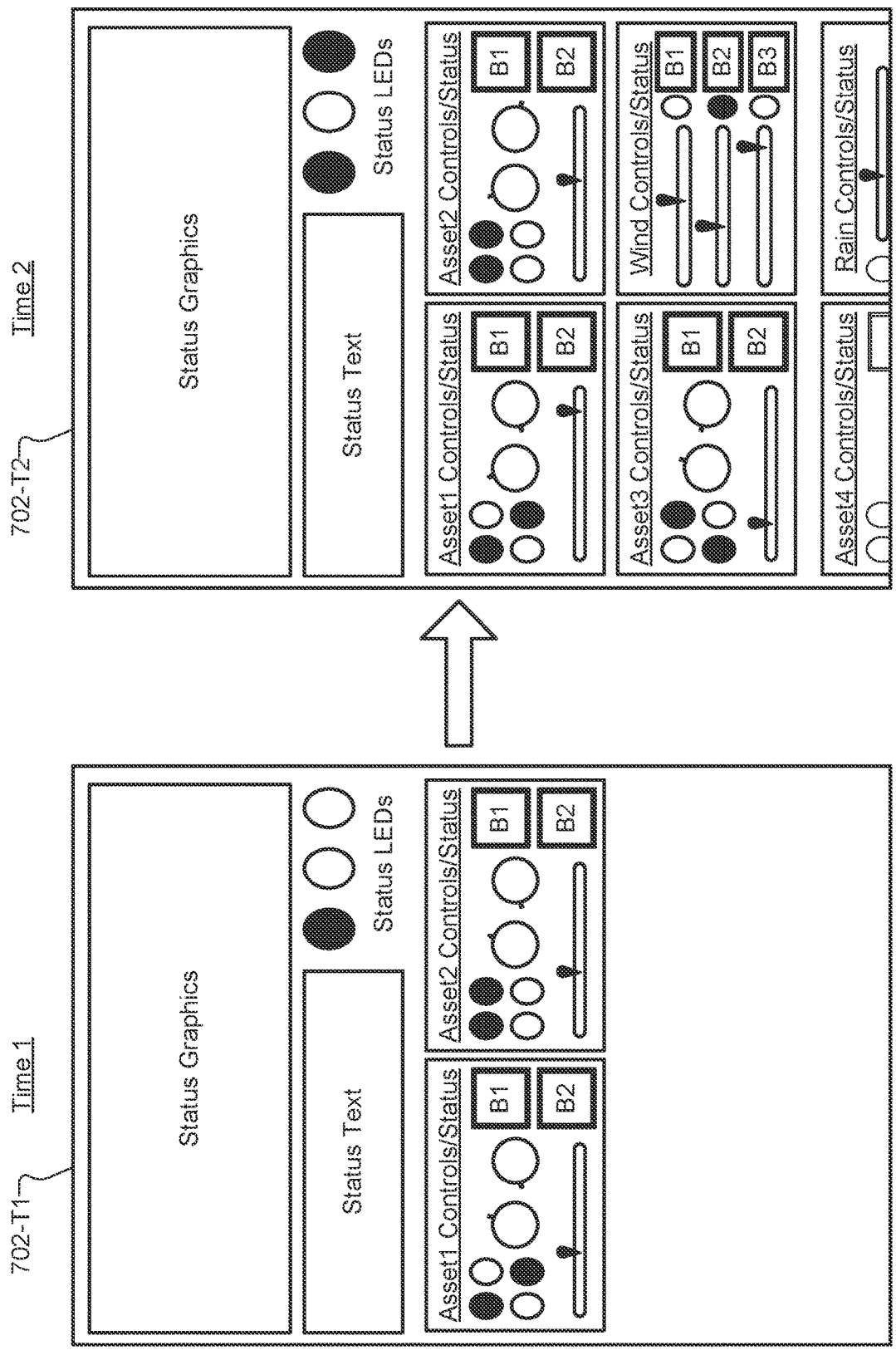
FIG. 7 shows an illustrative user-customized UI associated with graphics development at different times according to embodiments described herein.
Figure 8:
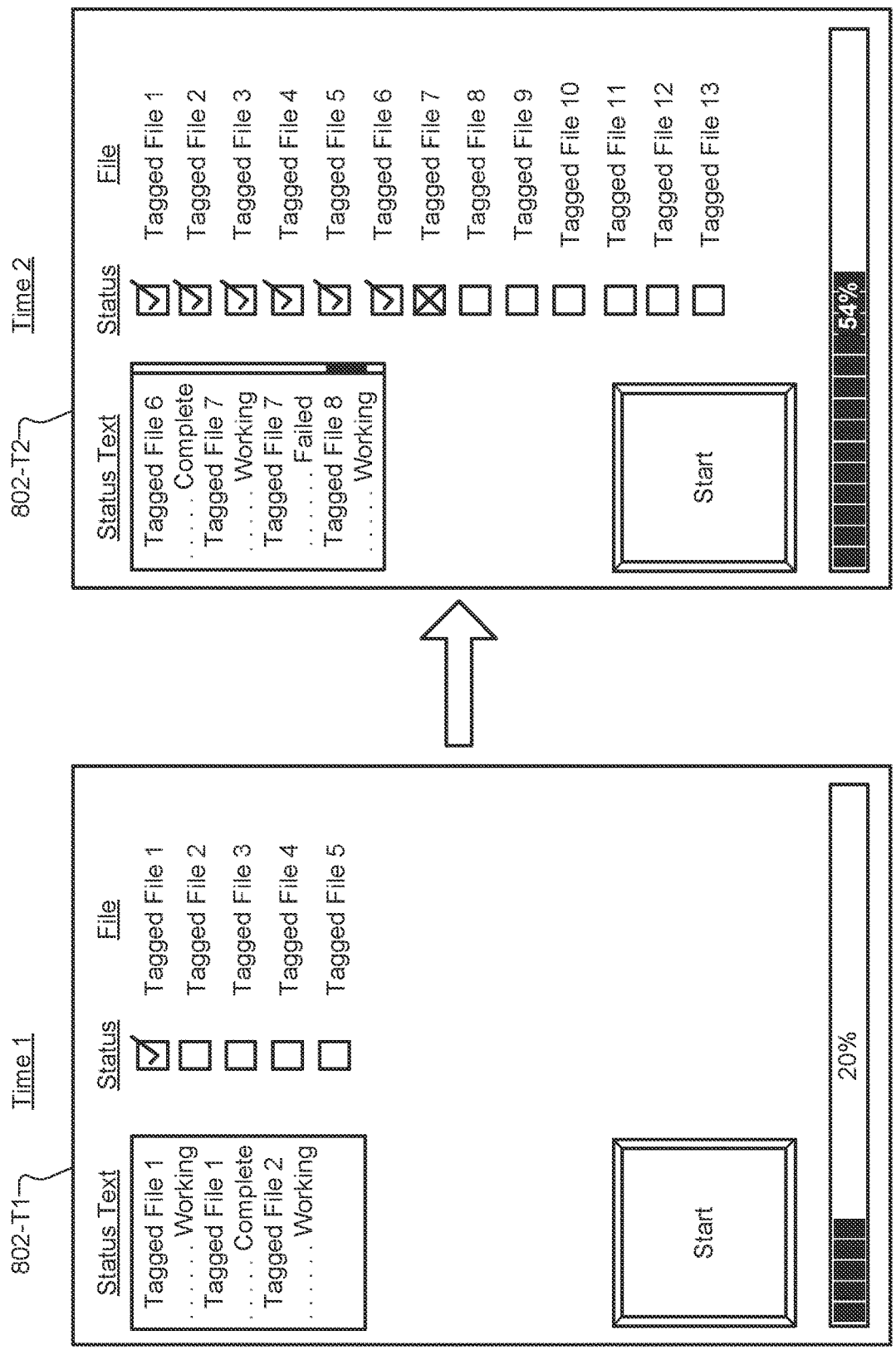
FIG. 8 shows an illustrative user-customized UI associated with data migration operations at different times according to embodiments described herein.

To provide certain additional examples of specific ways that a user-customized UI may be dynamically changed to facilitate MEC resource management in particular types of applications, FIGS. 7 and 8 each show specific examples of user-customized UIs with sets of UI elements that system 100 dynamically changes from one moment to another. Specifically, FIG. 7 shows an illustrative user-customized UI 702 associated with graphics development at different times (e.g., Time 1 at which the user-customized UI is labeled 702-T1, and Time 2 at which the user-customized UI is labeled 702-T2), and FIG. 8 shows an illustrative user-customized UI 802 associated with data migration operations at different times (e.g., Time 1 at which the user-customized UI is labeled 802-T1, and Time 2 at which the user-customized UI is labeled 802-T2).

In FIG. 7, user-customized UI 702 may be associated with graphics development being performed using MEC resources such as one or more of service 312 and instances of data 314 described above. For example, a developer user may be developing graphics for a distributed video game that includes several assets such as lighting assets, object assets, and so forth. Accordingly, the user may generate user-customized UI 702 to include a graphics window UI element (Status Graphics) to display a scene featuring certain assets or a scene that is under development, a text window UI element (Status Text) to indicate textual status information associated with the assets under development, and status LEDs that each can light up (e.g., in different colors, etc.) when various criteria are detected in the scene (e.g., when one object asset is partially occluded by another object, when an object has been modified or is currently changing, etc.). Additionally, as shown at Time 1 (user-customized UI 702-T1), a respective set of controls and status indicators (Asset1 Controls/Status and Asset2 Controls/Status) is shown to be included in the user-customized UI for each asset that is currently present within the scene. Each of these may include individual controls (e.g., knobs, buttons, sliders, etc.) and status indicators (e.g., status LEDs, etc.) associated with and unique to a particular instance of an asset. For example, if a jungle scene being developed currently includes two monkey object assets, a respective set of controls and status indicators for each monkey object (Asset1 and Asset 2) are shown to be included within the user-customized UI.

In this jungle example, the controls could cause the monkey to perform any suitable functions as may serve a particular implementation. For example, one knob may control a relative size of the monkey while the other may control the length of the monkey's tail. The slider may be associated with how dark the monkey is in color and each button may cause the monkey to perform a certain action (e.g., to jump, to grab a branch, to let go of a branch, etc.). It will be understood that the monkey example and all of the controls described are examples only, and that UI controls may be set up for any suitable asset and may be under complete control of the developer user. For instance, the developer could easily change the UI dataset to indicate that the knob used to control the monkey's tail length should instead be used to change the thickness of the monkey's fur or to facilitate the user in fine tuning, testing, or otherwise developing any particular feature of the monkey or other asset being developed. In a similar manner, the status LEDs may indicate any characteristics of the monkey as may serve a particular implementation and may be fully user-customizable to give the user extreme flexibility in seeing the results of changes to assets and applications being developed.

Along with manual changes to the UI elements included within user-customized UI 702 and/or the functionality of these UI elements, system 100 may also make automatic and dynamic changes as have been described. For example, system 100 may detect a user action with respect to a particular UI element of the set of UI elements included in the user-customized UI. The user action may be performed, for instance, by the developer user with respect to a RUI client presented on a client device. In response to the user action, system 100 may direct a MEC server such as MEC server 304 to provide graphics data that is associated with the graphics development and that reflects a graphics parameter defined by the user action. For instance, if the user action is to press a button that makes the monkey jump, system 100 may direct the appropriate service 312 of the MEC server to provide graphics data that changes pose (e.g., position and orientation) parameters for the monkey to make the monkey appear to jump. As another example, if the user action is to turn a knob to make the monkey larger, system 100 may direct the appropriate service 312 of the MEC server to provide graphics data that changes an overall size parameter of the monkey to make the monkey appear larger.

In some examples, the graphics data may represent one or more instances of a graphics element within a scene presented to the user as part of the graphics development, and the dynamically changing of the set of UI elements may be performed in response to an addition of an additional graphics element to the scene while the streaming data is being streamed to and from the client device. As such, the dynamically changing of the set of UI elements may include adding an additional UI element (e.g., an additional UI element associated with the additional graphics element added while the streaming data is being streamed to and from the client device) to the set of UI elements. To illustrate, it will be considered that the scene has changed to include several additional monkeys at Time 2. As such, user-customized UI 702-T2 shows that, at Time 2, system 100 dynamically changes the set of UI elements of user-customized UI 702 to further include UI controls and status indicators for an Asset 3 and an Asset 4 (together with the UI controls and status indicators for Assets 1 and 2). These UI elements may provide similar functionality for Assets 3 and 4 (e.g., the additional monkey objects) as described above for Assets 1 and 2. It is noted that, due to the screen space allocated for presenting user-customized UI 702, some of the UI elements dynamically added to user-customized UI 702 may not fit on the screen, such that the user may scroll down to view and manipulate these UI elements.

As further illustrated in the dynamically changed version of user-customized UI 702 (i.e., user-customized UI 702-T2), system 100 may detect that weather elements such as wind and rain have been added to the scene, and, in response, may populate controls and status indicators to allow the user to control and gain visibility into these aspects of the graphical development as well. For example, if the user is trying to test how the monkeys being developed react to wind forces, the user may manipulate sliders configured to control the strength and direction of the wind to gauge how such parameters affect the monkeys or other objects and assets presented in the scene (e.g., to determine at what wind strength a tree limb may break or a monkey may be blown away, etc.). As another example, the user may use user-customized UI 702-T2 to measure how much MEC processing power is used per monkey or how the MEC resources are effected when certain features of the monkeys (e.g., longer hair that is more complex to render in the wind, etc.) are employed.

It will be understood that the graphics development example described above in relation to the jungle scene and the monkeys is merely an example, and that various other graphics development applications and other applications may benefit from similar principles as those that have been described. For instance, the assets being controlled and monitored may relate to extended reality lighting, and different colors and intensities of lights for different light sources may be associated with UI elements to give great control and visibility to a developer who is developing or testing the lighting of a scene. In other graphical examples, similar control and status panels may be created to give a developer control and visibility of water elements, fire elements, other types of weather elements, and/or any other graphical assets or aspects as may serve a particular implementation.

User-customized UI 802 in FIG. 8 illustrates a different type of user-customized UI that may be used for a different type of MEC resource management application. Specifically, as mentioned above, illustrative user-customized UI 802 is associated with data migration operations being performed using MEC resources such as designated files or other instances of data 314 (e.g., files that have been tagged, listed, or otherwise designated by a user). The data migration operations may be performed by MEC server 304 and may include, for example, copying, moving, modifying, compiling, compressing, checking, rendering or otherwise processing data associated with each file.

In the example of FIG. 8, the set of UI elements at Time 1 (e.g., within user-customized UI 802-T1) is shown to include a respective UI element (e.g., a Status checkbox) associated with each marked data resource in a plurality of data resources accessible by way of MEC server 304 and associated with the data migration operations (e.g., associated with each Tagged File 1-5 under the File category). While only five tagged files are shown in user-customized UI 802-T1, it will be understood that a file migration employing these principles may involve hundreds or thousands of files in certain examples. As such, while a text box included within user-customized UI 802-T1 to indicate the status of the file migration (Status Text) may be useful, it may also be desirable for a user to be presented with UI elements such as the Status checkboxes shown. In this way, a user may avoid sifting through large amounts of text logs and, instead, may see at a glance which files have been successfully processed (e.g., checkboxes that have been checked or shaded a certain color, etc.), which files have failed the processing in some way (e.g., checkboxes with an 'X' or a different color, etc.), which files are currently being processed (e.g., checkboxes that are blinking, etc.), which files have not yet been processed but are waiting in queue (e.g. empty checkboxes that have not yet been changed), and so forth. Additionally, user-customized UI 802-T1 illustrates other convenient UI features that the user may implement within this UI, such as a progress bar for the file migration (at 20% at Time 1) and a button (Start) configured to initiate the migration of all the designated files.

In some examples, the user or the system may continue identifying (e.g., tagging and/or otherwise designating) tagged files that are to be migrated as part of the ongoing data migration. For example, by Time 2, eight additional tagged files (Tagged Files 6-13) have been identified. Accordingly, in these examples, system 100 may dynamically change the set of UI elements in response to a tagging (e.g., by the user while the streaming data is being streamed to and from the client device) of additional data resources in the plurality of data resources (e.g., additional instance of data 314), and the dynamic changing of the set of UI elements may include adding additional UI elements to the set of UI elements. The additional UI elements may be associated with the additional data resource marked by the user while the streaming data is being streamed to and from the client device. For example, as shown by user-customized UI 802-T2 at Time 2, additional checkbox UI elements associated with additional Tagged Files 5-13 have been dynamically added to user-customized UI 802-T2 even as the data migration is ongoing.

The illustrative applications shown in FIGS. 7 and 8 represent a few examples of the types of MEC resource management that may be facilitated and made more convenient by methods and systems for remote streaming of user-customized UIs described herein. However, it will be understood that various other applications that have not yet been explicitly described may also be facilitated by methods and systems described herein.

For example, a user-customized UI may be associated with system health monitoring operations being performed using the MEC resources. For example, when one file associated with a large distributed software program is changed in one location, it may have far reaching effects to other locations where copies of the file are stored or to other files that have not been modified to reflect the changes. Accordingly, system 100 may be used to implement a user-customized UI that would periodically check statistics of various files (e.g., thousands or millions of files) to determine and indicate an overall health of the program as changes are made by various people to various files. In such examples, system 100 may detect a user action performed by the user of the client device with respect to a particular UI element of the set of UI elements included in the user-customized UI, and, in response to the user action, may direct a MEC server to perform a status check service for each of a plurality of data resources accessible by way of the MEC server and associated with the system health monitoring operations. In this way, the overall health of the distributed files may be monitored as changes are made to the files, as data is migrated or converted to different file types, and/or as other changes are made that could affect the overall health of the software.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
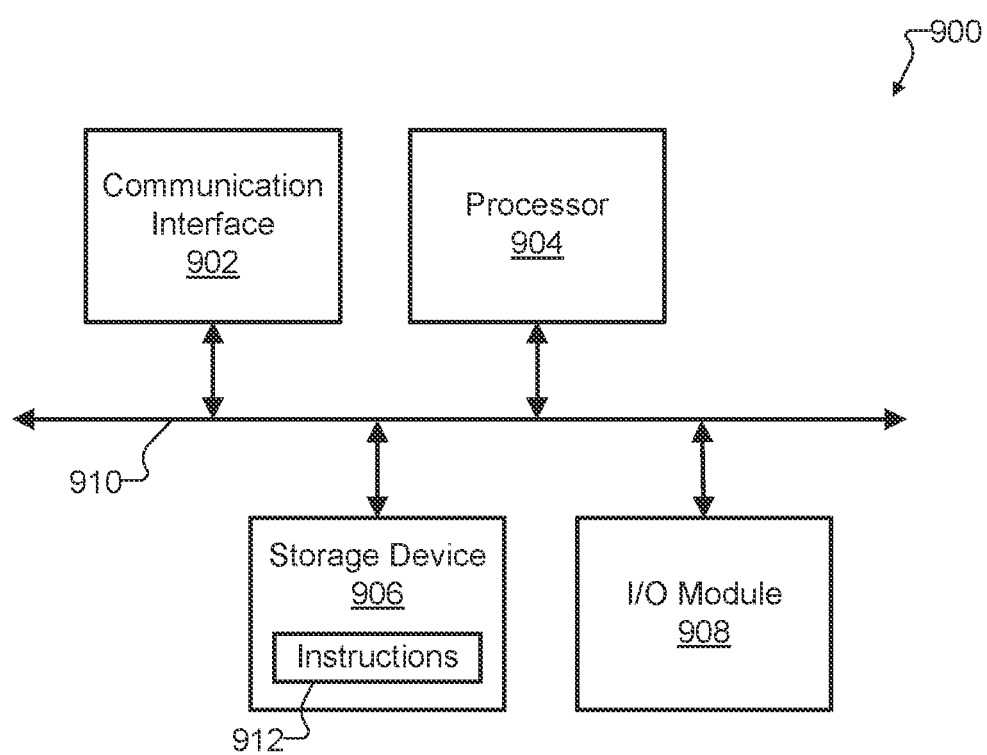
FIG. 9 shows an illustrative computing system according to principles described herein.

FIG. 9 shows an illustrative computing system 900 that may be specifically configured to perform one or more of the processes described herein. For example, computing system 900 may include or implement (or partially implement) a UI remote streaming system such as system 100, a client device such as client device 306 or 308, or any other computing systems or devices described herein.

As shown in FIG. 9, computing system 900 may include a communication interface 902, a processor 904, a storage device 906, and an input/output ("I/O") module 908 communicatively connected via a communication infrastructure 910. While an illustrative computing system 900 is shown in FIG. 9, the components illustrated in FIG. 9 are not intended to be limiting. Additional or alternative components may be used in other embodiments. Components of computing system 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 900. For example, one or more applications 912 residing within storage device 906 may be configured to direct processor 904 to perform one or more processes or functions associated with processor 104 of system 100. Likewise, memory 102 of system 100 may be implemented by or within storage device 906.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a user interface (UI) remote streaming system, that a first data resource of a plurality of data resources accessible by way of a multi-access edge computing (MEC) server is a tagged data resource;
   obtaining, by the UI remote streaming system, a UI dataset defining a user-customized UI that:
      provides a client device access to MEC resources including the plurality of data resources and a data migration service performed by or under direction of the MEC server to carry out a data migration operation on tagged data resources of the plurality of data resources, the data migration operation involving copying, moving, or processing the tagged data resources between or by way of one or more server-side computing systems that include the MEC server and exclude the client device, and
      includes a set of UI elements comprising a respective UI element for each of the tagged data resources of the plurality of data resources, wherein a first UI element of the set of UI elements is for the first data resource and is configured to indicate whether the data migration service has finished carrying out the data migration operation on the first data resource;
   streaming, by the UI remote streaming system based on the UI dataset, data to and from the client device, the streaming data configured to direct the client device to present the user-customized UI to a user of the client device to allow the user to manipulate the MEC resources using the set of UI elements;
   detecting, by the UI remote streaming system and while the streaming data is being streamed to and from the client device, that a second data resource of the plurality of data resources becomes a tagged data resource; and
   changing, by the UI remote streaming system and based on the detecting that the second data resource becomes a tagged data resource, the set of UI elements included within the user-customized UI to add a second UI element for the second data resource, the second UI element configured to indicate whether the data migration service has finished carrying out the data migration operation on the second data resource.

2. The method of claim 1, wherein the data migration operation includes copying or moving the tagged data resources from one server-side computing system to a different server-side computing system.

3. The method of claim 1, wherein the data migration operation includes compiling or compressing the tagged data resources using the one or more server-side computing systems.

4. The method of claim 1, wherein:
   when the data migration service has finished carrying out the data migration operation on the first data resource, the first UI element is further configured to indicate whether the data migration operation has been carried out successfully or has failed; and
   before the data migration service has finished carrying out the data migration operation on the first data resource, the first UI element is further configured to indicate whether the data migration service is currently processing the first data resource to carry out the data migration operation or has not yet processed the first data resource to carry out the data migration operation because the first data resource is waiting in queue.

5. The method of claim 1, wherein:
   the UI dataset defines the user-customized UI in accordance with an application programming interface that supports a plurality of different programming languages; and
   the UI dataset is developed using one of the plurality of different programming languages supported by the application programming interface.

6. The method of claim 1, wherein:
   the streaming of the data to and from the client device further includes streaming, based on the UI dataset, additional data to and from a second client device; and
   the additional data is configured to direct the second client device to present a different version of the user-customized UI to a second user of the second client device to allow the second user to manipulate the MEC resources using a second set of UI elements that is included in the different version of the user-customized UI.

7. The method of claim 6, wherein:
   the client device is associated with a first computing platform and presents the user-customized UI to the user by way of a UI client that is configured for the first computing platform;
   the second client device is associated with a second computing platform different from the first computing platform; and
   the second client device presents the different version of the user-customized UI to the second user by way of a UI client that is configured for the second computing platform.

8. The method of claim 1, wherein the streaming of the data is performed over a socket using a full-duplex messaging queue to allow simultaneous data transmission from the UI remote streaming system to the client device and from the client device to the UI remote streaming system.

9. The method of claim 1, wherein the set of UI elements further comprises:
   a text box to indicate, within the user-customized UI, status text associated with performance of the data migration service to carry out the data migration operation; and
   a progress bar to indicate overall progress for data migration being performed by the data migration service on the tagged data resources of the plurality of data resources.

10. The method of claim 1, wherein the set of UI elements further comprises a button element configured to initiate the data migration service to carry out the data migration operation.

11. The method of claim 1, wherein the respective UI elements for each of the tagged data resources of the plurality of data resources are implemented as checkbox UI elements displayed alongside text indicative of corresponding tagged data resources.

12. A system comprising:
   a memory storing instructions; and
   a processor communicatively coupled to the memory and configured to execute the instructions to:
      detect that a first data resource of a plurality of data resources accessible by way of a multi-access edge computing (MEC) server is a tagged data resource;
      obtain a UI dataset defining a user-customized UI that:
         provides a client device access to MEC resources including the plurality of data resources and a data migration service performed by or under direction of the MEC server to carry out a data migration operation on tagged data resources of the plurality of data resources, the data migration operation involving copying, moving, or processing the tagged data resources between or by way of one or more server-side computing systems that include the MEC server and exclude the client device, and includes a set of UI elements comprising a respective UI element for each of the tagged data resources of the plurality of data resources, wherein a first UI element of the set of UI elements is for the first data resource and is configured to indicate whether the data migration service has finished carrying out the data migration operation on the first data resource;

stream, based on the UI dataset, data to and from the client device, the streaming data configured to direct the client device to present the user-customized UI to a user of the client device to allow the user to manipulate the MEC resources using the set of UI elements;

detect, while the streaming data is being streamed to and from the client device, that a second data resource of the plurality of data resources becomes a tagged data resource; and change, based on the detecting that the second data resource becomes a tagged data resource, the set of UI elements included within the user-customized UI to add a second UI element for the second data resource, the second UI element configured to indicate whether the data migration service has finished carrying out the data migration operation on the second data resource.

13. The system of claim 12, wherein the data migration operation includes copying or moving the tagged data resources from one server-side computing system to a different server-side computing system.

14. The system of claim 12, wherein:
when the data migration service has finished carrying out the data migration operation on the first data resource, the first UI element is further configured to indicate whether the data migration operation has been carried out successfully or has failed; and
before the data migration service has finished carrying out the data migration operation on the first data resource, the first UI element is further configured to indicate whether the data migration service is currently processing the first data resource to carry out the data migration operation or has not yet processed the first data resource to carry out the data migration operation because the first data resource is waiting in queue.

15. The system of claim 12, wherein:
the streaming of the data to and from the client device further includes streaming, based on the UI dataset, additional data to and from a second client device; and
the additional data is configured to direct the second client device to present a different version of the user-customized UI to a second user of the second client device to allow the second user to manipulate the MEC resources using a second set of UI elements that is included in the different version of the user-customized UI.

16. The system of claim 12, wherein the streaming of the data is performed over a socket using a full-duplex messaging queue to allow simultaneous data transmission from the processor to the client device and from the client device to the processor.

17. The system of claim 12, wherein the set of UI elements further comprises one or more of:
a text box to indicate, within the user-customized UI, status text associated with performance of the data migration service to carry out the data migration operation;
a progress bar to indicate overall progress for data migration being performed by the data migration service on the tagged data resources of the plurality of data resources; or
a button element configured to initiate the data migration service to carry out the data migration operation.

18. A non-transitory computer-readable medium storing instructions that, when executed, direct a processor of a computing device to:
detect that a first data resource of a plurality of data resources accessible by way of a multi-access edge computing (MEC) server is a tagged data resource;
obtain a UI dataset defining a user-customized UI that:
provides a client device access to MEC resources including the plurality of data resources and a data migration service performed by or under direction of the MEC server to carry out a data migration operation on tagged data resources of the plurality of data resources, the data migration operation involving copying, moving, or processing the tagged data resources between or by way of one or more server-side computing systems that include the MEC server and exclude the client device, and
includes a set of UI elements comprising a respective UI element for each of the tagged data resources of the plurality of data resources, wherein a first UI element of the set of UI elements is for the first data resource and is configured to indicate whether the data migration service has finished carrying out the data migration operation on the first data resource;
stream, based on the UI dataset, data to and from the client device, the streaming data configured to direct the client device to present the user-customized UI to a user of the client device to allow the user to manipulate the MEC resources using the set of UI elements;
detect, while the streaming data is being streamed to and from the client device, that a second data resource of the plurality of data resources becomes a tagged data resource; and
change, based on the detecting that the second data resource becomes a tagged data resource, the set of UI elements included within the user-customized UI to add a second UI element for the second data resource, the second UI element configured to indicate whether the data migration service has finished carrying out the data migration operation on the second data resource.

19. The non-transitory computer-readable medium of claim 18, wherein the data migration operation includes copying or moving the tagged data resources from one server-side computing system to a different server-side computing system.

20. The non-transitory computer-readable medium of claim 18, wherein:
when the data migration service has finished carrying out the data migration operation on the first data resource, the first UI element is further configured to indicate whether the data migration operation has been carried out successfully or has failed; and
before the data migration service has finished carrying out the data migration operation on the first data resource, the first UI element is further configured to indicate whether the data migration service is currently processing the first data resource to carry out the data migration operation or has not yet processed the first data resource to carry out the data migration operation because the first data resource is waiting in queue.

\* \* \* \* \*